United States Patent
Jo et al.

(10) Patent No.: US 10,401,807 B2
(45) Date of Patent: Sep. 3, 2019

(54) METHOD FOR CONTROLLING NEARBY ELECTRONIC DEVICE BASED ON USER STATUS AND ELECTRONIC DEVICE THEREOF

(71) Applicant: Samsung Electronics Co., Ltd., Gyeonggi-do (KR)

(72) Inventors: Han-Kyung Jo, Seoul (KR); Do-Yoon Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 252 days.

(21) Appl. No.: 14/952,367

(22) Filed: Nov. 25, 2015

(65) Prior Publication Data

US 2016/0154392 A1    Jun. 2, 2016

(30) Foreign Application Priority Data

Nov. 27, 2014    (KR) .................... 10-2014-0167505

(51) Int. Cl.
| | | |
|---|---|---|
| *G05B 15/02* | (2006.01) | |
| *G05B 15/00* | (2006.01) | |
| *G08C 17/02* | (2006.01) | |
| *H04W 84/18* | (2009.01) | |
| *H04W 4/50* | (2018.01) | |
| *H04W 4/02* | (2018.01) | |
| *H04W 84/12* | (2009.01) | |
| *H04W 4/38* | (2018.01) | |
| *H04W 4/80* | (2018.01) | |

(52) U.S. Cl.
CPC ............. *G05B 15/02* (2013.01); *G08C 17/02* (2013.01); *H04W 4/50* (2018.02); *H04W 4/027* (2013.01); *H04W 4/38* (2018.02); *H04W 4/80* (2018.02); *H04W 84/12* (2013.01)

(58) Field of Classification Search
CPC ......... G05B 15/02; G08C 17/02; H04W 4/50; H04W 4/38; H04W 4/80; H04W 4/027
USPC ........................................................ 700/12
See application file for complete search history.

(56) References Cited

U.S. PATENT DOCUMENTS

| | | | |
|---|---|---|---|
| 8,335,568 B2 | 12/2012 | Heruth et al. | |
| 8,655,307 B1* | 2/2014 | Walker | H04W 52/0212 |
| | | | 455/405 |
| 9,020,572 B2* | 4/2015 | Mensinger | A61B 5/7445 |
| | | | 600/345 |
| 2008/0157956 A1 | 7/2008 | Radivojevic et al. | |

(Continued)

FOREIGN PATENT DOCUMENTS

| | | |
|---|---|---|
| CN | 102665132 | 9/2012 |
| CN | 102857824 | 1/2013 |

(Continued)

OTHER PUBLICATIONS

European Search Report dated Jan. 27, 2016 issued in counterpart application No. 15196777.5-1870, 6 pages.

(Continued)

*Primary Examiner* — Ly D Pham
(74) *Attorney, Agent, or Firm* — The Farrell Law Firm, P.C.

(57) ABSTRACT

A method and an apparatus are provided for operating an electronic device. A status of a user wearing the electronic device is determined using a sensor disposed in the electronic device. An operational status of a nearby electronic device is wirelessly controlled according to the status.

16 Claims, 12 Drawing Sheets

(56) References Cited

U.S. PATENT DOCUMENTS

| | | | |
|---|---|---|---|
| 2009/0253454 A1* | 10/2009 | Sampson | H04M 1/72566 455/550.1 |
| 2013/0158368 A1* | 6/2013 | Pacione | A61B 5/0022 600/301 |
| 2014/0037109 A1 | 2/2014 | Ban | |
| 2014/0073486 A1* | 3/2014 | Ahmed | A61B 5/02405 482/9 |
| 2014/0120961 A1* | 5/2014 | Buck | H04W 4/12 455/466 |
| 2014/0171055 A1 | 6/2014 | Oshita | |
| 2014/0240122 A1* | 8/2014 | Roberts | A61B 5/0022 340/539.11 |
| 2015/0251074 A1* | 9/2015 | Ahmed | A61B 5/02405 700/91 |
| 2016/0151603 A1* | 6/2016 | Shouldice | H04R 3/00 600/28 |

FOREIGN PATENT DOCUMENTS

| | | |
|---|---|---|
| CN | 103777615 | 5/2014 |
| CN | 103893963 | 7/2014 |
| CN | 104110888 | 10/2014 |
| CN | 104122864 | 10/2014 |
| CN | 104154633 | 11/2014 |
| CN | 104170360 | 11/2014 |
| EP | 2 423 785 | 2/2012 |
| KR | 1020090005269 | 1/2009 |
| KR | 1020120051125 | 5/2012 |
| KR | 101386823 | 4/2014 |

OTHER PUBLICATIONS

Chinese Office Action dated Sep. 19. 2017 issued in counterpart application No. 201510848933.0, 44 pages.

Chinese Office Action dated Jun. 4, 2018 issued in counterpart application No. 201510848933.0, 50 pages.

* cited by examiner

METHOD FOR CONTROLLING NEARBY ELECTRONIC DEVICE BASED ON USER STATUS AND ELECTRONIC DEVICE THEREOF

PRIORITY

This application claims priority under 35 U.S.C. § 119(a) to an application filed in the Korean Intellectual Property Office on Nov. 27, 2014 and assigned Serial No. 10-2014-0167505, the content of which is incorporated herein by reference.

BACKGROUND

1. Field of the Disclosure

Embodiments of the present disclosure relate generally to control of an electronic device, and more particularly, to a method for controlling a nearby electronic device based on a user status, and an electronic device thereof.

2. Description of the Related Art

Various types of mobile terminals, such as, for example, a smart phone and a Personal Computer (PC), and various types of wearable devices, such as, for example, a smart watch and smart glasses, are widely in use.

Further, various types of home appliances, such as, for example, a smart TeleVision (TV), and an air conditioner, and various types of automotive electronics, such as, for example, a car audio system and a car navigation system, are widely in use.

The mobile terminal, the wearable device, and the home appliances may be referred to as a mobile electronic device, a wearable electronic device, and a home electronic device, respectively. Each of the devices may be collectively referred to an electronic device.

SUMMARY

The present disclosure has been made to address at least the above problems and/or disadvantages and to provide at least the advantages described below. Accordingly, an aspect of the present disclosure provides a method for controlling a nearby electronic device on the basis of a user status, and an electronic device thereof.

According to an embodiment of the present disclosure, a method is provided for operating an electronic device. A status of a user wearing the electronic device is determined using a sensor disposed in the electronic device. An operational status of a nearby electronic device is wirelessly controlled according to the status.

According to an embodiment of the present disclosure, an electronic device is provided that includes a measurement module configured to determine a status of a user, and a communication module configured to communicate with a nearby electronic device. The electronic device also includes a processor configured to control the measurement module to determine the status of the user wearing the electronic device using a sensor disposed in the electronic device, and control the communication module to wirelessly control an operational status of the nearby electronic device according to the status.

According to another embodiment of the present disclosure, a computer readable recording medium storing a program for performing a method for operating an electronic device is provided. The method includes determining a status of a user wearing the electronic device using a sensor disposed in the electronic device. The method also includes wirelessly controlling an operational status of a nearby electronic device according to the status.

BRIEF DESCRIPTION OF THE DRAWINGS

The above and other aspects, features and advantages of the present disclosure will be more apparent from the following detailed description when taken in conjunction with the accompanying drawings, in which.

DETAILED DESCRIPTION

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 1:
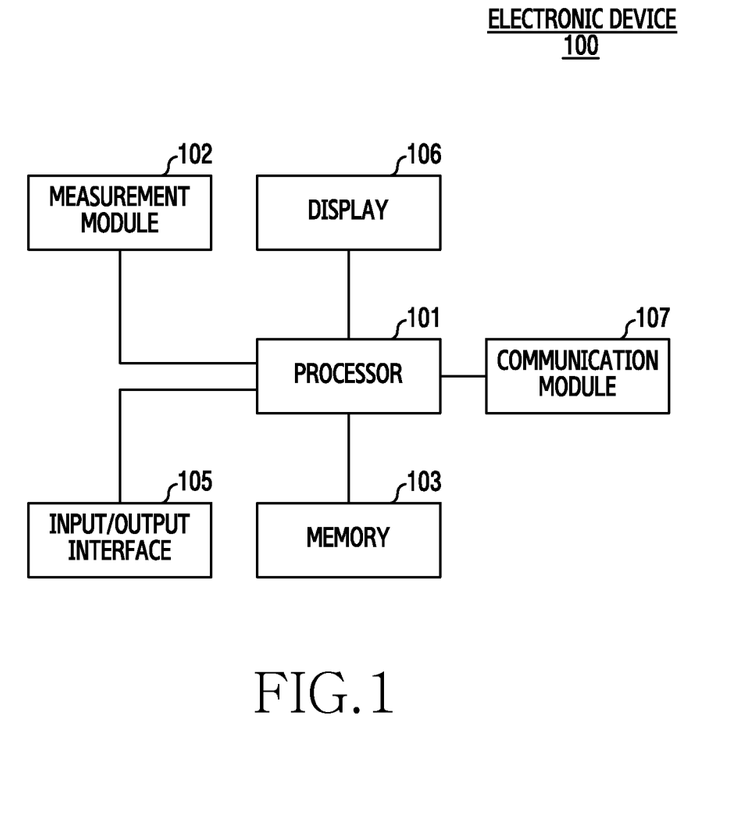
FIG. 1 is a diagram illustrating a block diagram of an electronic device, according to an embodiment of the present disclosure.

FIG. 1 is a diagram illustrating an electronic device, according to an embodiment of the present disclosure. For example, an electronic device 100 may be embodied as a wearable electronic device, such as, for example, a smart watch and smart glasses, which can be worn by a user.

Referring to FIG. 1, the electronic device 100 includes a processor 101, a measurement module 102, a memory 103, an input/output interface 105, a display 106, and a communication module 107. The measurement module 102 may determine a status of a user wearing the electronic device 100. The user status may be a sleep status, a wake-up status, an exercise status, a movement status, or the like.

The communication module 107 may wirelessly communicate with nearby electronic devices located within a specific distance from the electronic device 100, and may wirelessly communicate with another electronic device or a server separated by a far distance through a network. For example, the communication module 107 may include a Radio Frequency (RF) module or a wireless communication module, and the wireless communication module may include WiFi or BlueTooth (BT).

The processor 101 may operatively control the measurement module 102 to determine the user status, and may operatively control the communication module 107 to directly and wirelessly control an operational status of a predetermined nearby electronic device, according to the user status.

The nearby electronic devices may be, for example, a mobile electronic device (e.g., a smart phone), a home electronic device (e.g., a smart TV), an automotive electronic device (e.g., a car navigation system), or the like. The communication module 107 may perform short-distance wireless communication with the nearby electronic devices through BT, WiFi, WiFi-Direct, or the like.

The processor 101 may operatively control the measurement module 102 to determine at least one of the sleep status, wake-up status, exercise status, or movement status of the user. According to the status, the processor 101 may operatively and wirelessly control the communication module 107 to directly control power, screen brightness, audio level, alarm output, or the like of the predetermined nearby electronic device in various manners.

The memory 103 may include a volatile memory and/or a non-volatile memory. The memory 103 may store, for example, instructions or data (e.g. image data) relevant to at least one other element of the electronic device 100.

The input/output interface 105, for example, may function as an interface that may transfer instructions or data input from a user or another external device to the other element(s) of the electronic device 100. Furthermore, the input/output interface 105 may output the instructions or data received from the other element(s) of the electronic device 100 to the user or another external device.

The display 106 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 106, for example, may display various types of content (e.g., text, images, videos, icons, or symbols) for the user.

Figure 2:
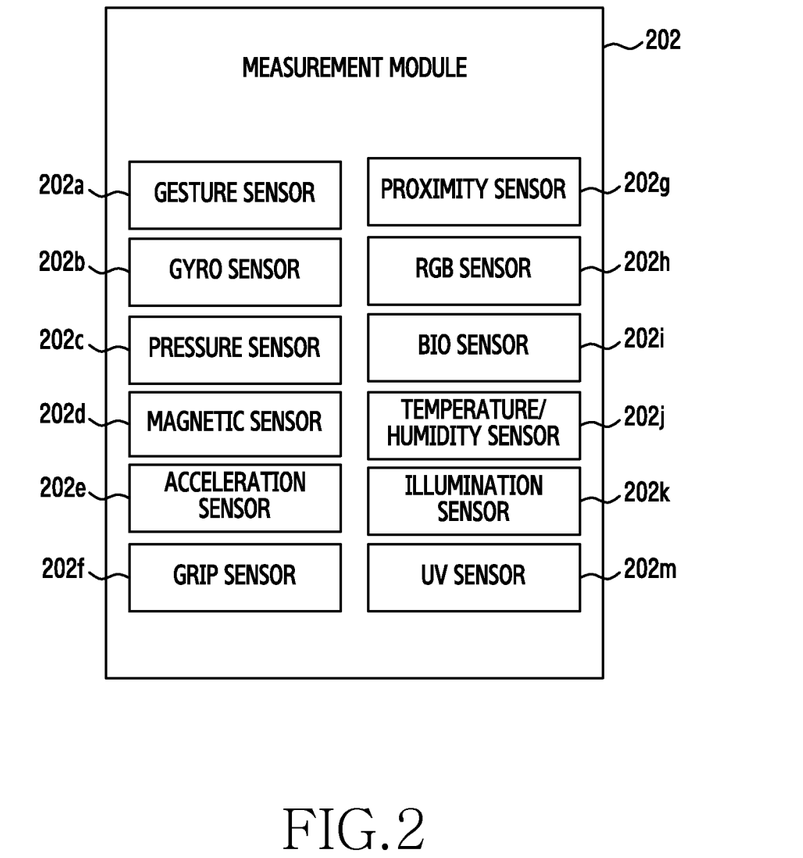
FIG. 2 is a diagram illustrating a structure of a measurement module, according to an embodiment of the present disclosure.

FIG. 2 is a diagram illustrating a structure of a measurement module, according to an embodiment of the present disclosure. Referring to FIG. 2, a measurement module 202 includes, for example, at least one of a gesture sensor 202a, a gyro sensor 202b, a pressure sensor 202c, a magnetic sensor 202d, an acceleration sensor 202e, a grip sensor 202f, a proximity sensor 202g, a Red, Green, Blue (RGB) sensor 202h, a bio sensor 202i, a temperature/humidity sensor 202j, an illumination sensor 202k, and an UltraViolet (UV) sensor 202m.

The measurement module 202 may measure a physical quantity or may detect an operational status of an electronic device worn by a user. Thus, the measurement module 202 may convert measured or detected information into an electric signal. The measurement module 202 may further include an E-nose sensor, an ElectroMyoGraphy (EMG) sensor, an ElectroEncephaloGram (EEG) sensor, an ElectroCardioGram (ECG) sensor, a fingerprint sensor, or the like.

Figure 3:
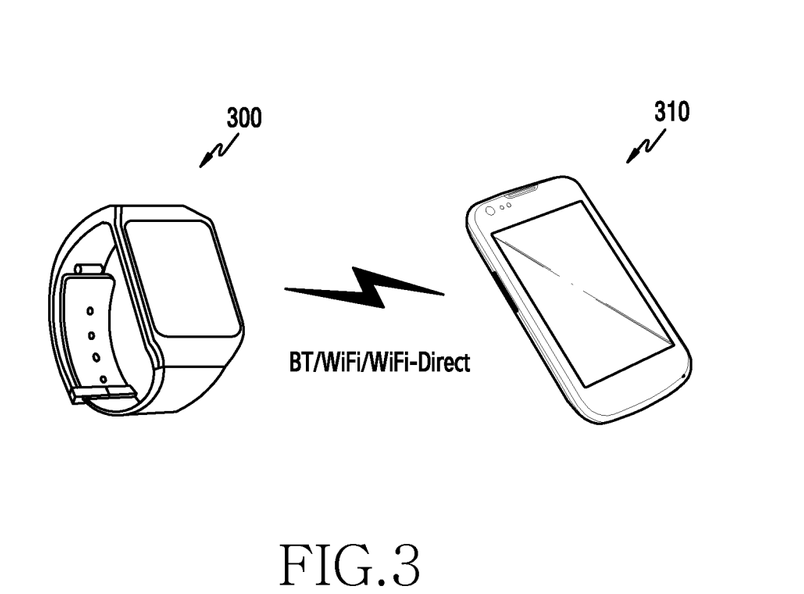
FIG. 3 is a diagram illustrating wireless communication between an electronic device and a nearby electronic device, according to an embodiment of the present disclosure.

FIG. 3 is a diagram illustrating wireless communication between an electronic device and a nearby electronic device, according to an embodiment of the present disclosure. An electronic device 300 is a wearable electronic device, such as, for example, a smart watch that can be worn by a user, and a nearby electronic device 310 is embodied as a mobile electronic device, such as, for example, a smart phone.

The electronic device 300 may directly communicate with the nearby electronic device 310 through short-distance wireless communication, such as BT, WiFi, WiFi-Direct, or the like. Further, the electronic device 300 and the nearby electronic device 310 may perform a preliminary synchronization establishment operation, and may share an operational status generated in each of the devices on a real-time basis.

For example, a user who wears the electronic device 300 may control at least a portion of the operational status of the nearby electronic device 310 through the electronic device 300, and also may control at least a portion of the operational status of the electronic device 300 through the nearby electronic device 310.

Figure 4:
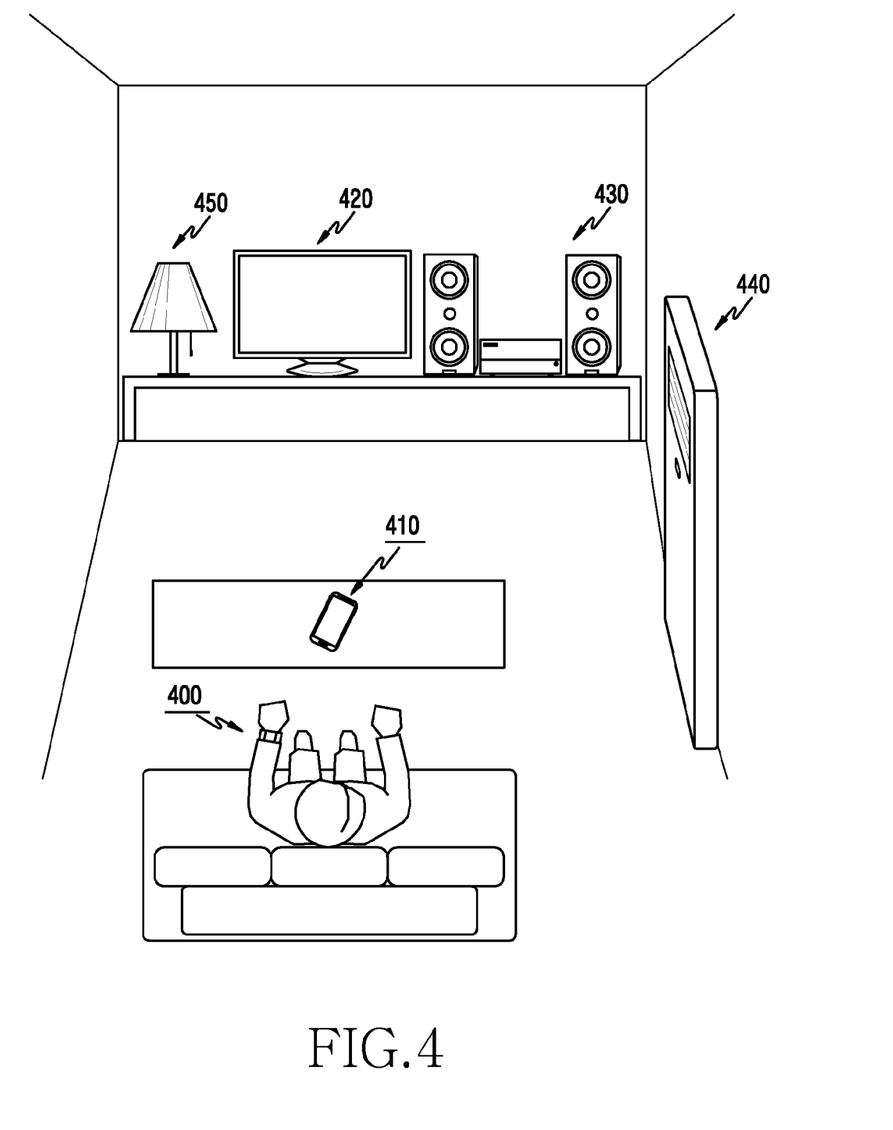
FIG. 4 is a diagram illustrating various nearby electronic devices, which wirelessly communicate with an electronic device, according to an embodiment of the present disclosure.

FIG. 4 is a diagram illustrating various nearby electronic devices that wirelessly communicate with an electronic device, according to an embodiment of the present disclosure. A wearable electronic device 400, such as a smart watch that is worn on a wrist of a user, may wirelessly communicate with various types of nearby electronic devices 410 to 450 located within a specific distance.

The nearby electronic devices that are capable of wirelessly communicating with the electronic device 400 may include, for example, a mobile electronic device (e.g., a smart phone), a home electronic device (e.g., a smart TV), an automotive electronic device (e.g., a car navigation), or the like.

Referring to FIG. 4, a user sitting in a living room at home may wear the electronic device 400, and the electronic device 400 may wirelessly communicate with a smartphone 410 located within a specific distance. The electronic device 400 and the smartphone 410 may perform a preliminary synchronization establishment operation, and may share an operational status generated in each of the electronic device 400 and the smartphone 410 on a real-time basis.

For example, the user may manipulate the electronic device 400 to directly configure a function of determining the user status and controlling the smartphone 410 to the electronic device 400, or may manipulate the smartphone 410 preliminarily synchronized with the electronic device 400 to indirectly configure the function of determining the user status and controlling the smartphone 410 to the electronic device 400.

When the function of determining the user status and controlling the nearby electronic device is configured directly or indirectly, as described above, the electronic device 400 may determine the user status by using at least one sensor included in the electronic device 400, and may directly and wirelessly control an operational status of a predetermined nearby electronic device according to the status.

For example, the measurement module 102 of the electronic device 400 may use the acceleration sensor 200e, the bio sensor 200i, or the like, to determine the user status. If the status shows that there is almost no change in motion for the user during a predetermined reference time (e.g., 2 hours) and a biological change of the user corresponds to a predetermined sleep status, e.g., a para-sleep status or an ortho-sleep status, the processor 101 may operatively control the communication module 107 so that predetermined nearby electronic devices are directly and wirelessly controlled to continuously maintain a sleep status of the user.

For example, if the user status is the para-sleep status, the user status may be induced to the ortho-sleep status by decreasing a screen brightness of a smart TV 420 located within a specific distance, by decreasing a volume level of an audio device 430, by decreasing cold air strength or the like of an air conditioner 440, and by decreasing a brightness of a light device 450.

If the user status is the ortho-sleep status, the user status is continuously maintained in the sleep status by powering off the smart TV 420 located within the specific distance, by powering off the audio device 430, by adjusting the cold air strength or the like of the air conditioner 440, and by powering off the light device 450.

The nearby electronic devices 410 to 450 controlled by the electronic device 400 may be automatically predetermined through short-distance wireless communication, such as, BT, WiFi, or WiFi-Direct, or may be manually determined by the user through a menu selection. For example, the user may randomly determine the nearby electronic devices through the menu selection such that the light device 450 is not powered off even if the user status is the ortho-sleep status.

Figure 5:
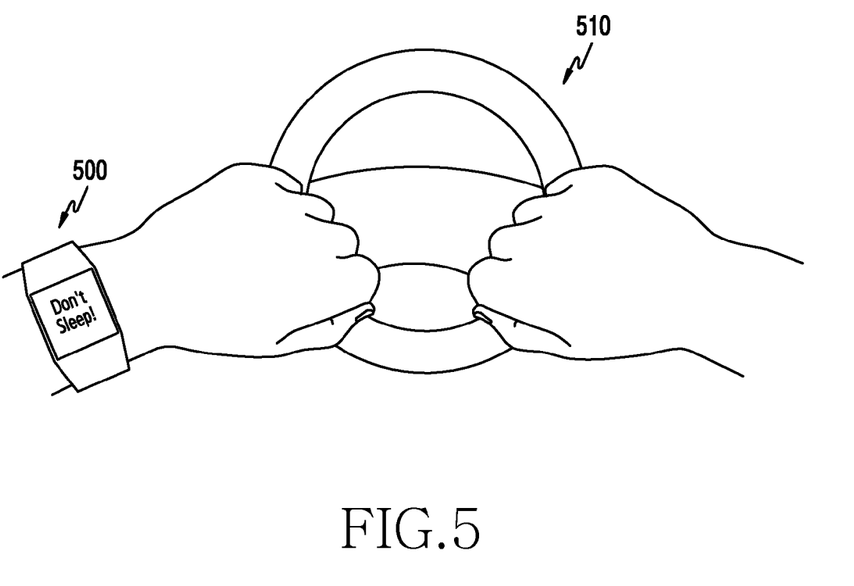
FIG. 5 is a diagram illustrating an anti-drowsy alert message displayed on an electronic device, according to an embodiment of the present disclosure.

FIG. 5 is a diagram illustrating an anti-drowsy alert message displayed on an electronic device, according to an embodiment of the present disclosure. Referring to FIG. 5, for example, a user that is driving by using a steering wheel 510 wears an electronic device 500. The electronic device 500 may determine a user status, and if the user status is a para-steep status, an anti-drowsy alert message (e.g., Don't sleep) may be displayed in various manners while outputting a vibration, an alarm sound, or the like.

Further, if the user status is an ortho-sleep status, the electronic device 500 may directly and wirelessly control an operational status of automotive electronic devices, such as an in-vehicle car navigation system, a car audio system, or the like, and thus, the anti-drowsy alert message, the alarm sound, or the like, can be output more intensively to the user who is driving.

Furthermore, if the user status is the ortho-sleep status, the electronic device 500 may wirelessly communicate with an automotive electronic control device, which controls an automotive engine or the like to gradually decrease a driving speed, thereby preventing a car accident caused by drowsy driving.

Figure 6:
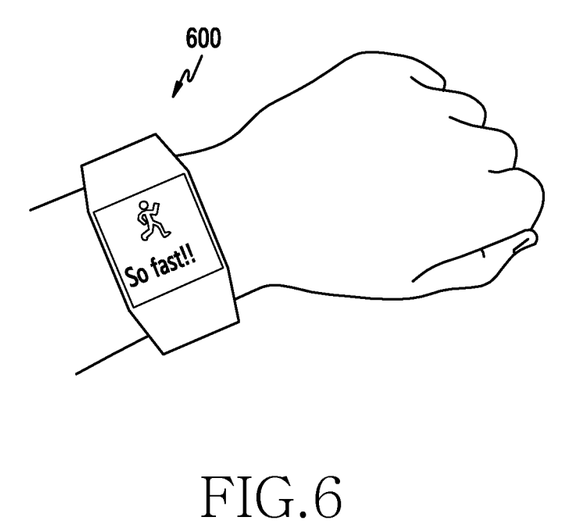
FIG. 6 is a diagram illustrating a speed alert message displayed on an electronic device, according to an embodiment of the present disclosure.

FIG. 6 is a diagram illustrating a speed alert message displayed on an electronic device, according to an embodiment of the present disclosure. Referring to FIG. 6, for example, a user may wear an electronic device 600, while riding sports equipment such as, for example, a bicycle, a skateboard, or the like.

The electronic device 600 may determine a user status, and if the user status indicates that the user is moving faster than a predetermined reference speed, an alert message (e.g., "Too fast") is displayed to report that a movement speed is too fast while outputting a vibration and an alarm sound, thereby preventing an accident.

Further, the electronic device 600 may measure a biological change of the user. If the status shows that a heart rate of the user is faster than a predetermined reference heart rate, the electronic device 600 may display an alert message (e.g., "Too fast") to report that the movement speed is too fast while outputting the vibration and the alarm sound, thereby avoiding an accident.

Figure 7:
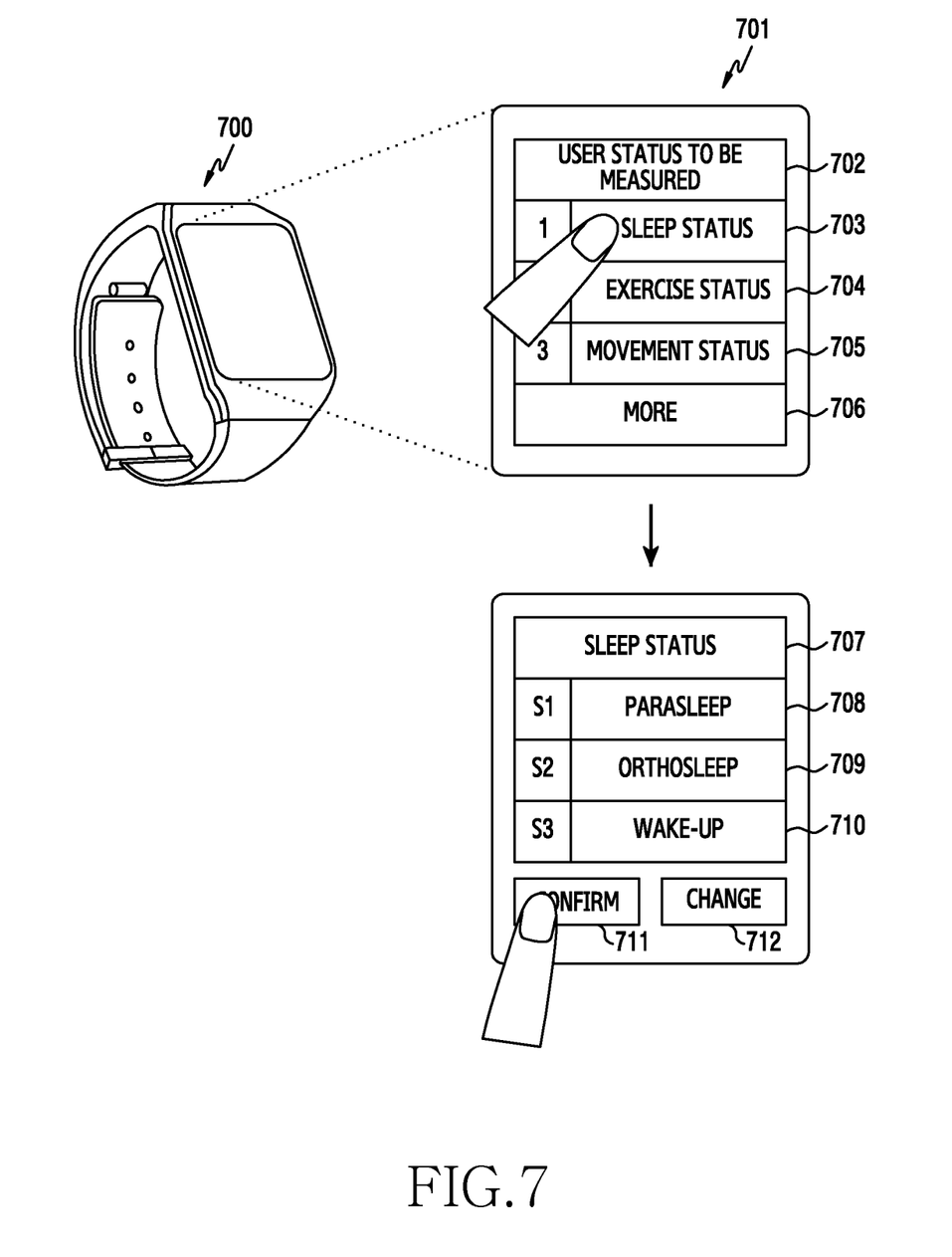
FIG. 7 is a diagram illustrating a determination menu displayed on an electronic device and of a user status to be measured, according to an embodiment of the present invention.

FIG. 7 is a diagram illustrating a determination menu screen displayed on an electronic device and a user status to be determined, according to an embodiment of the present invention. Referring to FIG. 7, an electronic device 700 may display a determination menu screen 701, including a user status to be determined, as a user interface screen through which user manipulation is possible.

For example, within a determination menu 702 of the user status to be determined, the electronic device 700 displays various selective items such as, for example, a sleep status 703, an exercise status 704, and a movement status 705 in the format of a list capable of accepting a user touch. The electronic device also displays a menu item (e.g., "more") 706 to show additional selective items.

Upon selecting any one of the selective items, the electronic device 700 may display sub-items of detailed multiple steps corresponding to the selective item. For example, when a user selects a selective item of the sleep status 703, sub-items of a sleep status menu 707, including a para-sleep status 708, an ortho-sleep status 709, and a wake-up status 710 are displayed, as sub-items corresponding to the sleep status 703.

If the user touches a confirm button 711 after selecting the para-sleep status 708, the ortho-sleep status 709, and the wake-up status 710 among the sub-items, the electronic device 700 may determine the sleep status as the para-sleep status, the ortho-sleep status, or the wake-up status.

If the user touches a change button 712 after selecting only the ortho-sleep status 709 among the sub-items, the electronic device 700 may determine the sleep status only for the determination step for the ortho-sleep status. Herein, respective reference values for determining the para-sleep status, the ortho-sleep status, and the wake-up status are reference values resulting from different experiments, and may be pre-stored in the electronic device 700 or may be downloaded from a server or the like connected through a network.

Figure 8:
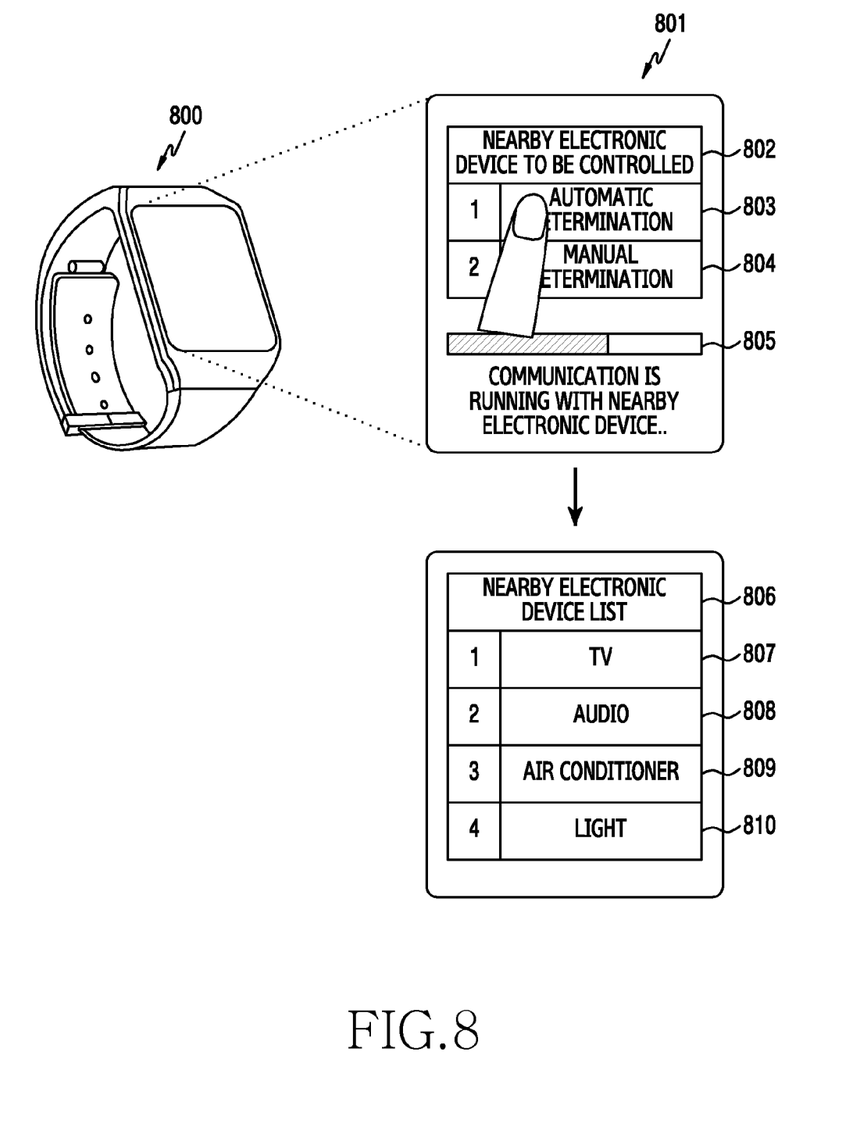
FIG. 8 is a diagram illustrating an automatic determination menu displayed on an electronic device and of a nearby electronic device to be controlled, according to an embodiment of the present disclosure.

FIG. 8 is a diagram illustrating an automatic determination menu displayed on an electronic device and a nearby electronic device to be controlled, according to an embodiment of the present disclosure. Referring to FIG. 8, the electronic device 800 displays a determination menu screen 801 of the nearby electronic device to be controlled, according to a user status, as a user interface screen capable of receiving user manipulation.

For example, the electronic device 800 displays selective items such as, for example, an automatic determination 803 and a manual determination 804, in the format of a list capable of receiving a user touch, in a determination menu 802 of the nearby electronic device to be controlled. The determination menu 802 may also display additional selective items.

When any one of the selective items is selected, the electronic device 800 may perform the automatic determination or the manual determination according to the corresponding selective item. For example, when the user selects the automatic determination 803, the electronic device 800 may perform wireless communication with several nearby electronic devices located within a specific distance through short-distance wireless communication, such as, for example, BT, WiFi, WiFi-Direct, etc. An indicator 805 having, for example, a shape of a bar, may be displayed to report that communication is taking place with the nearby electronic device.

Through the wireless communication with the nearby electronic devices, the electronic device 800 may configure a list of nearby electronic devices that are currently running. Thereafter, according to a user selection, a list 806 of nearby electronic devices to be controlled is displayed. Referring o FIG. 8, the nearby electronic device list 806 includes, for example, a TV 807, an audio device 808, an air conditioner 809, and a light device 810, which are currently running.

Figure 9:
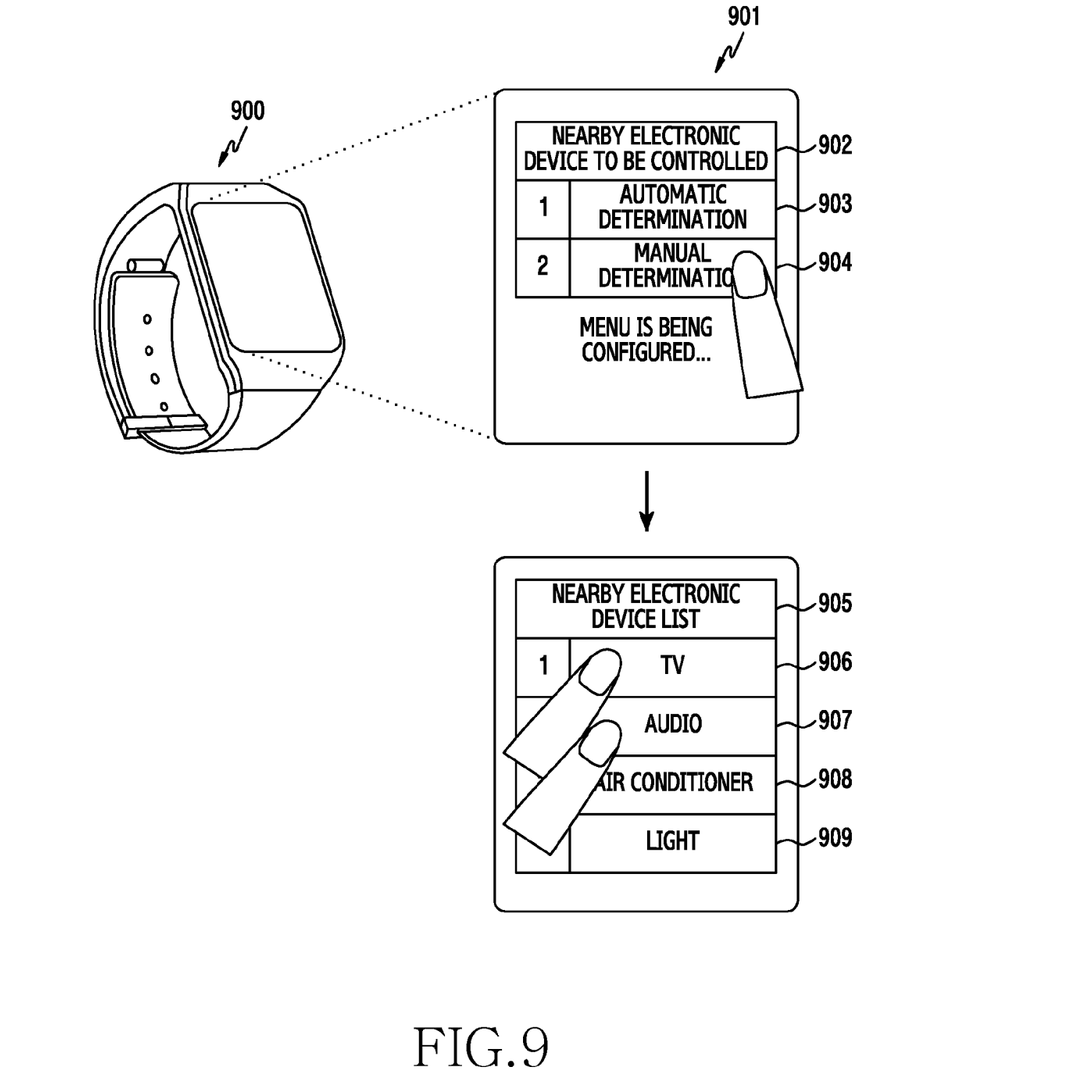
FIG. 9 is a diagram illustrating a manual determination menu displayed on an electronic device and of a nearby electronic device to be controlled, according to an embodiment of the present disclosure.

FIG. 9 is a diagram illustrating a manual determination menu displayed on an electronic device and a nearby electronic device to be controlled, according to an embodiment of the present disclosure. Referring to FIG. 9, the electronic device 900 displays a determination menu screen 901 of the nearby electronic device to be controlled, according to a user status, as a user interface screen capable of receiving a user manipulation.

The electronic device 900 may display selective items including, for example, an automatic determination 903 and a manual determination 904, in the format of a list capable of receiving a user touch, in a determination menu 902 of the nearby electronic device to be controlled. The electronic device 900 may also display additional selective items.

When a user selects a selective item of the manual determination 903, the electronic device 900 may search a list 905 of nearby electronic devices to be controlled, according to a user status, from a memory of the electronic device 900 or may download the list through a network in order to display the list.

Referring to FIG. 9, the nearby electronic device list 905 includes, for example, a TV 906, an audio device 907, an air conditioner 908, and a light device 909. The user may select desired specific electronic devices from the list of the nearby electronic devices, and based on a user status, may determine the selected devices as the nearby electronic device to be controlled.

For example, when the user selects only the TV 906 and the audio device 907 from the nearby electronic device list 905, the electronic device 900 may perform wireless communication with the TV 906 and the audio device 907 located within a specific distance through short-distance wireless communication, such as, for example, BT, WiFi, WiFi-Direct, or the like.

The electronic device 900 may determine whether the TV 906 and the audio device 907 are currently through wireless communication with the TV 906 and the audio device 907. If it is determined that the TV 907 and the audio device 907 are running, these devices may be determined as the nearby electronic devices to be controlled based on a user status.

If it is determined that the TV 906 and the audio device 907 are not running, a message, such as a user selection error, may be displayed. Accordingly, the user may simply select only desired specific nearby electronic devices from the nearby electronic device list 905. Further, the user may confirm whether a user selection is valid.

Figure 10:
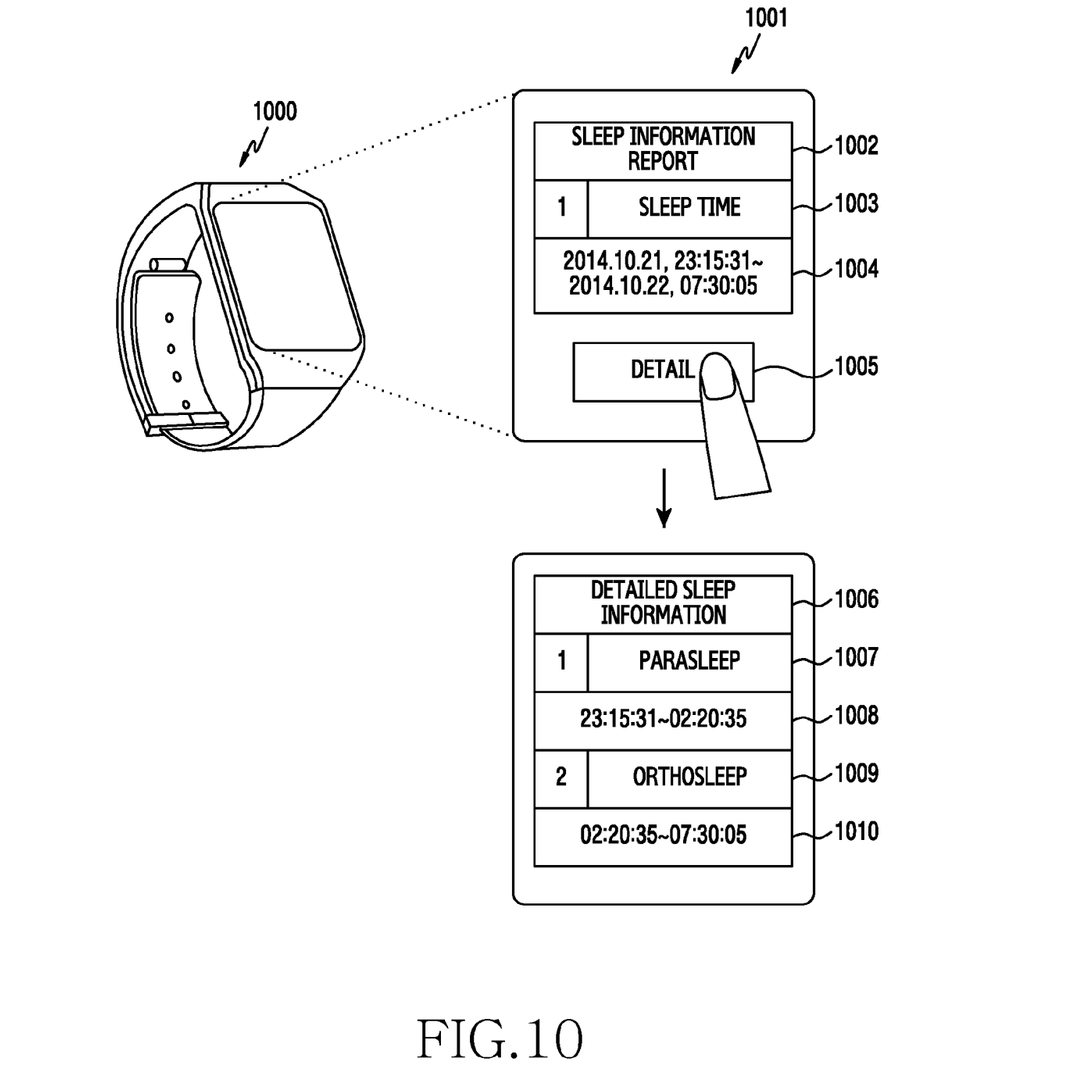
FIG. 10 is a diagram illustrating a sleep information report message displayed on an electronic device, according to an embodiment of the present disclosure.

FIG. 10 is a diagram illustrating a sleep information report message displayed on an electronic device, according to an embodiment of the present disclosure. An electronic device 1000 may store various user statuses in a memory. For example, if the user status is a sleep status, in order to maintain the sleep status of a user, the user status should not be displayed but should instead be stored in the electronic device 1000. The user status may be stored in association with a sleep time as sleep information of the user.

Referring to FIG. 10, if the user status shows is changed from the sleep status to a wake-up status, or if the user requests a sleep information report 1002 through a key manipulation or the like, the electronic device 1000 may display a time 1004 of sleep as sleep time information 1003 of the user.

Further, when the user selects a detail button 1005 displayed on the sleep information report screen, more detailed sleep information 1006 may be displayed. The detailed sleep information 1006 includes, for example, a real sleep time 1008 of a para-sleep status 1007 and a real sleep time 1010 of an ortho-sleep status 1009.

Figure 11:
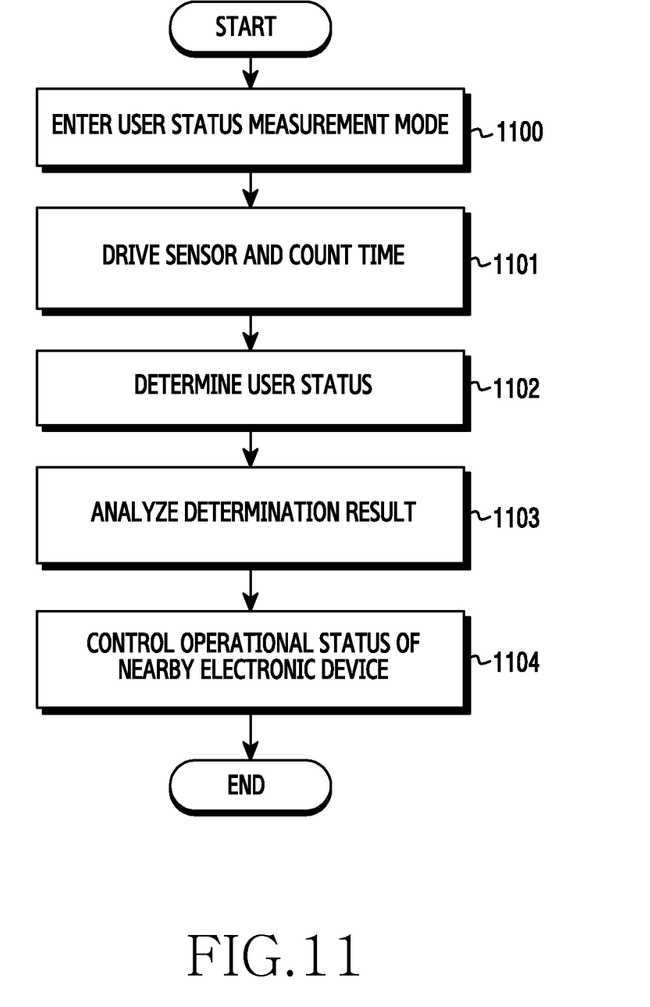
FIG. 11 is a flowchart illustrating a method for controlling a nearby electronic device based on a user status, according to an embodiment of the present disclosure.

FIG. 11 is a flowchart illustrating a method for controlling a nearby electronic device based on a user status, according to an embodiment of the present disclosure. Referring to FIG. 11, in step 1100, when a user wears the electronic device 1000, the electronic device 1000 automatically enters a user status determination mode, or manually enters the user status determination mode through a user selection.

In step 1101, upon entering the user status determination mode, the electronic device 1000 drives at least one sensor (e.g., an acceleration sensor, a bio sensor, or the like) included in the electronic device 1000, and performs a time counting operation.

In step 1102, the electronic device 1000 uses the sensor to detect a user's movement, motion, heart rate, or the like, and counts a time during which the detected values are changed or maintained. Thus, the user status is determined to be a sleep status, a wake-up status, an exercise status, a movement status, or the like.

In step 1103, the electronic device 1000 analyzes a determination of the user status to determine a more detailed user status. For example, if the user status is the sleep status, the user status may be divided it into a para-sleep status, an ortho-sleep status, and the like.

In step 1104, the electronic device 1000 wirelessly controls an operational status of nearby electronic devices based on the user status. For example, if the user status is the para-sleep status, the electronic device 1000 may decrease a screen brightness, an audio level, or the like, of a nearby TV so that the user is able to enter the ortho-sleep status.

Further, if the user status is the ortho-sleep status, the electronic device 1000 may power off the nearby TV, so that the user can maintain the ortho-sleep status.

Figure 12:
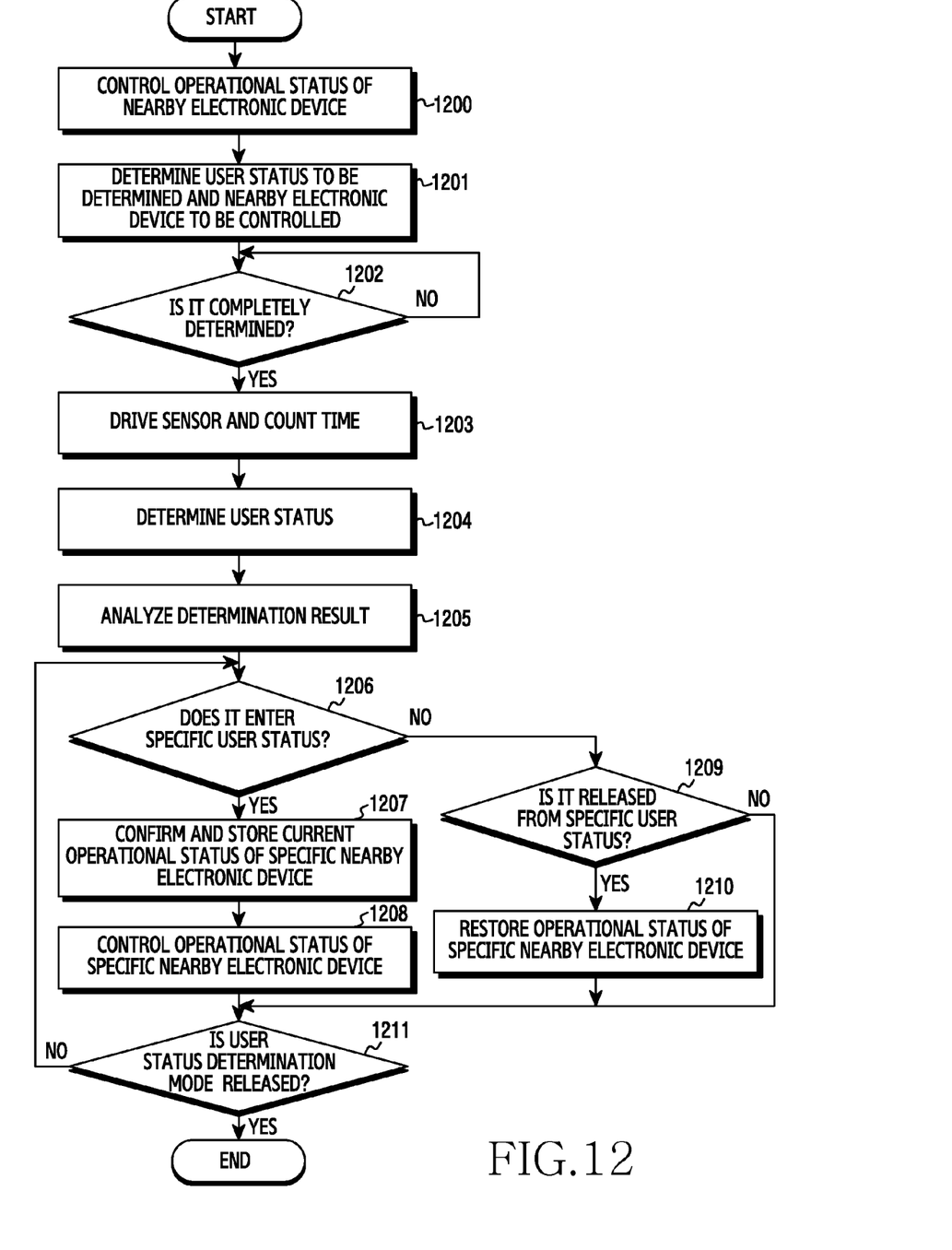
FIG. 12 is a flowchart illustrating a method for controlling a nearby electronic device based on a user status, according to an embodiment of the present disclosure.

FIG. 12 is a flowchart illustrating a method for controlling a nearby electronic device based on a user status, according to an embodiment of the present disclosure. Referring to FIG. 12, in step 1200, when a user wears the electronic device 1000, the electronic device 1000 automatically enters a user status determination mode, or manually enters the user status determination mode according to a user's selection or the like.

In step 1201, upon entering the user status determination mode, the electronic device 1000 determines a user status to be determined and a nearby electronic device to be controlled. For example, the user may select at least one of a sleep status, a wake-up status, an exercise status, and a movement status as the user status to be determined, and may select at least one of a mobile electronic device (e.g., a smart phone), a home electronic device (e.g., a smart TV), and an automotive electronic device (e.g., a car navigation system) as the nearby electronic device to be controlled.

In stem 1202, according to the user's selection as described above, the electronic device 1000 determines whether the user status to be determined and the nearby electronic device to be controlled are determined. The user status and the nearby electronic device may be automatically determined by a specific application that is running in the electronic device 1000.

If the user status and the nearby electronic device have not been determined, the methodology repeats step 1202. If the user status and the nearby electronic device have been determined, the electronic device 1000 drives at least one sensor (e.g., an acceleration sensor, a bio sensor, or the like) necessary to measure the user status, and performs a time counting operation, in step 1203.

In step 1204, the electronic device 1000 uses the sensor to detect a user's movement, motion, heart rate, or the like, and counts a time during which the detected values are changed or maintained. Thus, the user status may be determined as a sleep status, a wake-up status, an exercise status, a movement status, or the like, or only one specific user status selected by the user may be determined.

In step 1205, the electronic device 1000 analyzes a determination result of the user status to determine a more detailed user status. For example, if the user status is the sleep status, the user status may be divided it into a para-sleep status, an ortho-sleep status, and the like.

In step 1206, it is determined whether the user enters a specific user status. If the user enters a specific user status, the electronic device 1000 confirms a current operational status of a specific nearby electronic device located within a specific distance through short-distance wireless communication, such as BT, WiFi, WiFi-Direct, or the like, and stores identification information of the specific nearby electronic device and current operational status information.

In step 1208, the electronic device 1000 wirelessly controls the operational status of the specific nearby electronic device based on the user status. For example, if the user status is the para-sleep status, the electronic device 1000 may confirm and store a current screen brightness and audio level information of a nearby TV, and thereafter, may decrease the current screen brightness, audio level, or the like of the TV, so that the user is able to enter the ortho-sleep status.

Further, if the user status is the ortho-sleep status, the electronic device 1000 may power off the nearby TV, so that the user can maintain the ortho-sleep status.

If the user does not enter a specific user status, in step 1206, it is determined whether the user is released from the specific user status, in step 1209. If the user is released from the specific user status, the electronic device 1000 restores the operational status of the specific nearby electronic device located within the specific distance to an original status through short-distance wireless communication, such as BT, WiFi, WiFi-Direct, or the like, in step 1210.

For example, if the user status is released from the ortho-sleep status, and thus, transitions to the wake-up status, the electronic device 1000 may confirm the previously stored screen brightness and audio level information of the TV, and thereafter, may power on the TV and restore the screen brightness and audio level of the TV to the original status.

If the user is not released from the specific user status in step 1209, or after the operation status is restored in step 1210, or after an operational status is controlled in step 1208, the electronic device 1000 determines whether the user status determination mode is released by, for example, user selection or the like, in step 1211. If the user status determination mode is not released, the methodology returns to step 1206. If the user status determination mode is released, the methodology of FIG. 12 terminates.

While the present disclosure has been shown and described with reference to embodiments thereof, it will be understood by those skilled in the art that various changes in form and detail may be made therein without departing from the spirit and scope of the present disclosure as defined by the appended claims and their equivalents.

What is claimed is:

1. A method for operating an electronic device, the method comprising:
   identifying, by a wearable electronic device, a motion status of a user wearing the wearable electronic device using a sensor disposed in the wearable electronic device, wherein the motion status of the user comprises at least one of a sleep status, a wake-up status, an exercise status, and a movement status of the user;
   in response to identifying the motion status of the user, identifying a subcategory status of the identified motion status of the user wearing the wearable electronic device, wherein the subcategory status includes a more detailed user status of the identified motion status;
   detecting, by the wearable electronic device, a nearby electronic device;
   determining an appropriate control for the nearby electronic device according to the identified motion status and the identified subcategory status; and
   wirelessly controlling, by the wearable electronic device, an operational status of the nearby electronic device according to the appropriate control,
   wherein the subcategory status of the sleep status includes one of a para-sleep status and an ortho-sleep status.

2. The method of claim 1, wherein
   the nearby electronic device includes at least one of a mobile electronic device, a home electronic device, and an automotive electronic device.

3. The method of claim 1, wherein wirelessly controlling the operational status of the nearby electronic device comprises wirelessly controlling at least one of a power, a screen brightness, an audio level, and an alarm output of the nearby electronic device.

4. The method of claim 3, wherein detecting the nearby electronic device comprises:
   automatically detecting the nearby electronic device through wireless communication with the wearable electronic device; or
   manually detecting the nearby electronic device based on a selection by the user.

5. The method of claim 1, wherein the operational status of the nearby electronic device is wirelessly controlled through at least one of BlueTooth (BT), WiFi, and WiFi-Direct.

6. The method of claim 1, further comprising, prior to wirelessly controlling the operational status of the nearby electronic device, confirming the operational status of the nearby electronic device and storing the operational status in the wearable electronic device.

7. The method of claim 1, further comprising, if the identified motion status of the user is the sleep status, storing the identified motion status in the electronic device without displaying an indication at the wearable electronic device.

8. The method of claim 7, further comprising, if the identified motion status of the user changes from the sleep status to the wake-up status, restoring the operational status of the nearby electronic device to a previous operational status that existed prior to the sleep status.

9. A wearable electronic device comprising:
   a measurement module configured to identify a motion status of a user wearing the wearable electronic device;
   a communication module configured to communicate with a nearby electronic device; and a processor is configured to:
- control the measurement module to identify the motion status of the user using a sensor disposed in the wearable electronic device, wherein the motion status of the user comprises at least one of a sleep status, a wake-up status, an exercise status, and a movement status of the user,
- in response to identifying the motion status of the user, identify a subcategory status of the identified motion status of the user, wherein the subcategory status includes a more detailed user status of the identified motion status,
- detect the nearby electronic device,
- determine an appropriate control for the nearby electronic device according to the identified motion status and the identified subcategory status,
- control the communication module to wirelessly control an operational status of the nearby electronic device according to the appropriate control,
- wherein the subcategory status of the sleep status includes one of a para-sleep status and an ortho-sleep status.

10. The wearable electronic device of claim 9, wherein the nearby electronic device includes at least one of a mobile electronic device, a home electronic device, and an automotive electronic device.

11. The wearable electronic device of claim 9, wherein, in wirelessly controlling the operational status of the nearby electronic device, the processor is further configured to wirelessly control at least one of a power, a screen brightness, an audio level, and an alarm output of the nearby electronic device.

12. The wearable electronic device of claim 11, wherein the nearby electronic device is automatically detected through wireless communication with the wearable electronic device or is manually determined based on a selection by the user.

13. The wearable electronic device of claim 9, wherein the processor wirelessly controls the operational status of the nearby electronic device through at least one of BlueTooth (BT), WiFi, and WiFi-Direct.

14. The wearable electronic device of claim 9, wherein, prior to wirelessly controlling the operational status of the nearby electronic device, the processor is further configured to confirm the operational status of the nearby electronic device and to store the operational status in the wearable electronic device.

15. The wearable electronic device of claim 9, wherein, if the identified motion status of the user is the sleep status, the processor is further configured to store the identified motion status in the wearable electronic device without displaying the identified motion status at the wearable electronic device, and
- wherein, if the identified motion status of the user changes from the sleep status to the wake-up status, the processor is further configured to restore the operational status of the nearby electronic device to a previous operational status that existed prior to the sleep status.

16. A non-transitory computer readable recording medium storing a program for performing a method for operating a wearable electronic device, the method comprising:
- identifying, by a wearable electronic device, a motion status of a user wearing the wearable electronic device using a sensor disposed in the wearable electronic device, wherein the motion status of the user comprises at least one of a sleep status, a wake-up status, an exercise status, and a movement status of the user;
- in response to identifying the motion status of the user, identifying a subcategory status of the identified motion status of the user wearing the wearable electronic device, wherein the subcategory status includes a more detailed user status of the identified motion status;
- detecting, by the wearable electronic device, a nearby electronic device;
- determining an appropriate control for the nearby electronic device according to the identified motion status and the identified subcategory status; and
- wirelessly controlling, by the wearable electronic device, an operational status of the nearby electronic device according to the appropriate control,
- wherein the subcategory status of the sleep status includes one of a para-sleep status and an ortho-sleep status.

* * * * *